US005773544A

United States Patent [19]
Christell et al.

[11] Patent Number: 5,773,544
[45] Date of Patent: *Jun. 30, 1998

[54] POLYCHLOROPRENE COMPOSITION

[75] Inventors: Lance Alan Christell, Prospect; Richard Misak Tabibian, Louisville, both of Ky.

[73] Assignee: Dupont Dow Elastomers, Wilmington, Del.

[*] Notice: The term of this patent shall not extend beyond the expiration date of Pat. No. 5,527,846.

[21] Appl. No.: 781,737

[22] Filed: Jan. 10, 1997

Related U.S. Application Data

[63] Continuation-in-part of Ser. No. 611,114, Mar. 5, 1996, abandoned, which is a continuation-in-part of Ser. No. 411,183, Mar. 27, 1995, Pat. No. 5,527,846.

[51] Int. Cl.[6] ............................. C08F 2/38; C08F 4/32; C08F 136/18
[52] U.S. Cl. ........................ 526/223; 526/85; 526/224; 526/295
[58] Field of Search ............................ 526/85, 223, 224, 526/295

[56] References Cited

U.S. PATENT DOCUMENTS

| | | | |
|---|---|---|---|
| 3,619,226 | 11/1971 | Hargreaves, II et al. | 106/287.23 |
| 3,651,037 | 3/1972 | Snow, Jr. | 524/273 |
| 3,651,038 | 3/1972 | Snow, Jr. | 524/273 |
| 3,872,043 | 3/1975 | Branlard et al. | 524/764 |
| 3,899,459 | 8/1975 | Branlard et al. | 524/764 |
| 3,925,340 | 12/1975 | Khan | 526/224 |
| 3,926,880 | 12/1975 | Esser et al. | 524/273 |
| 3,929,752 | 12/1975 | Cooper et al. | 526/224 |
| 3,932,355 | 1/1976 | Barney et al. | 526/224 |
| 4,007,145 | 2/1977 | Edmondson | 526/223 |
| 4,155,891 | 5/1979 | Pettelkau et al. | 524/217 |
| 4,339,372 | 7/1982 | Branlard et al. | 524/169 |
| 4,629,816 | 12/1986 | Heinrich et al. | 570/229 |
| 4,788,239 | 11/1988 | Chang | 524/273 |
| 4,857,616 | 8/1989 | Musch et al. | 526/223 |
| 4,975,501 | 12/1990 | Musch et al. | 526/213 |
| 5,332,771 | 7/1994 | Christell | 524/270 |
| 5,527,846 | 6/1996 | Christell | 524/273 |

FOREIGN PATENT DOCUMENTS

| | | |
|---|---|---|
| 1155581 | 10/1983 | Canada . |
| 2059425 | 7/1992 | Canada . |
| 5149999 | 4/1973 | Germany . |
| 52-66592 | 6/1977 | Japan . |
| 58-222169 | 12/1983 | Japan . |
| 1031968 | 7/1983 | U.S.S.R. . |

*Primary Examiner*—Peter A. Szekely
*Attorney, Agent, or Firm*—Marilyn H. Bromels, Esq.

[57] ABSTRACT

Crystalline polychloroprene compositions comprise mercaptan-modified or xanthogen disulfide-modified 2-chloro-1,3-butadiene homopolymers having gel contents of 5–80 percent by weight. The polymers are prepared by free radical emulsion polymerization at a temperature of 5°–20° C. to a conversion of 70–95 percent in the presence of $2.5 \times 10^{-4}$–$5.5 \times 10^{-4}$ moles of mercaptan or xanthogen disulfide modifier per mole of 2-chloro-1,3-butadiene.

6 Claims, No Drawings

POLYCHLOROPRENE COMPOSITION

CROSS-REFERENCE TO RELATED APPLICATIONS

This is a continuation-in-part of co-pending U.S. patent application Ser. No.08/611,114 filed Mar. 5, 1996, now abandoned which is a continuation-in-part of application Ser. No. 08/411,183 filed Mar. 27, 1995, now U.S. Pat. No. 5,527,846.

BACKGROUND OF THE INVENTION

This invention relates to polychloroprene compositions. More specifically, this invention relates to polychloroprene compositions which are particularly suited for use in aqueous adhesives employed for bonding foamed polymeric materials such as polyurethanes and polyolefins to substrates including bonded fibre board, thermoplastic olefins, fabric, and polyurethanes.

Polymers of chloroprene (i.e. 2-chloro-1,3-butadiene) are well known, commercially available elastomers useful in the manufacture of general rubber goods, adhesives, and coating compositions. They are especially suited for formulation of contact adhesives, which are generally sold in the form of cements, i.e. solutions of polymers and additives in organic solvents. Most commonly, the polychloroprenes used as elastomeric components in these cements are chloroprene homopolymers having relatively high levels of crystallinity. Such polymers promote rapid adhesive bond strength development, i.e. green bond strength, without the requirement of a further curing step. See R. M. Murray, et al., *The Neoprenes,* Elastomer Chemicals Department, E. I. du Pont de Nemours & Co. (1963), p.83.

A disadvantage of the use of highly crystalline chloroprene homopolymers, however, is that cements containing them are susceptible to bond failure at temperatures of, for example, 80° C.–95° C., unless a second curing step is employed. It is known that chloroprene copolymers generally exhibit excellent high temperature resistance. Despite this enhanced thermal resistance, merely substituting chloroprene copolymers for chloroprene homopolymers is not an acceptable means to solve the problem of temperature susceptibility of polychloroprene homopolymer cements.

This is because chloroprene copolymers have inherently low crystallinity and therefore, adhesives containing these polymers exhibit inferior green bond strength. Thus, neither chloroprene homopolymer cements of the prior art nor chloroprene copolymer cements of the prior art combine outstanding high temperature resistance and green bond strength.

A further disadvantage of polychloroprene cements is that they usually contain large quantities of volatile organic solvents. Due to environmental concerns, and in view of the recognized safety hazards associated with organic solvents, the use of aqueous latex adhesives is more desirable than the use of solvent-based adhesives in many applications. There is thus a need in the art for improved polychloroprene adhesives which exhibit superior high temperature resistance coupled with green bond strength, yet which are environmentally safe.

SUMMARY OF THE INVENTION

The present invention is directed to an elastomer which comprises a mercaptan-modified or xanthogen disulfide-modified crystalline 2-chloro-1,3-butadiene homopolymer having a gel content of 5–80 percent by weight which is prepared by free radical emulsion polymerization at a temperature of 5° C.–20° C., to a conversion of 70–95 percent, in the presence of $2.5 \times 10^{-4}$–$5.5 \times 10^{-4}$ moles of mercaptan or xanthogen disulfide modifier per mole of 2-chloro-1,3-butadiene.

DETAILED DESCRIPTION OF THE INVENTION

The elastomers of the present invention are highly crystalline homopolymers of chloroprene (2-chloro-1,3-butadiene). These polychloroprenes are further characterized by having a gel content of 5–80 percent by weight. The combination of specific polymer structure and gel content of the homopolymer permits attainment of excellent heat resistance and outstanding bond strengths when the polymer is formulated into aqueous latex adhesive compositions. In addition, such adhesive compositions are environmentally acceptable because they do not require the presence of any organic solvent.

The polychloroprenes may be prepared by free radical-initiated emulsion polymerization processes such as described in U.S. Pat. No. 2,567,117. That is, the emulsion polymerization is generally carried out at a chloroprene monomer concentration of about 40–55 percent and at a pH of 10 to 14 in the presence of a free radical generator. Examples of suitable free radical generators include organic or inorganic peroxides, persulfates, or hydroperoxides in a redox system, for example, in the presence of potassium sulfite or sodium hydrosulfite. An important feature of the present invention is that the polymers are prepared at polymerization temperatures of from 5° C.–20° C., preferably from 10° C.–20° C. When polymers prepared within this temperature range are formulated into adhesives, it has been found that adhesive green bond strength is significantly enhanced.

Another principal feature of the present invention concerns the gel content of the chloroprene homopolymer component of the adhesive. The term "gel content", when used in reference to polymers, indicates the amount of polymer insoluble in an organic solvent, generally benzene, toluene, or tetrahydrofuran. As molecular weight of a polymer is increased, a point is reached at which a crosslinked, gelled fraction is formed. Gel measurement is, therefore, a gauge of crosslinked content. The chloroprene homopolymers of the present invention have gel contents of 5–80 percent. Polymers having gel contents of 15–35% are preferred. If polymers having gel contents lower than 5 percent are employed, high temperature resistance is compromised, whereas if polymers having gel contents above 80 percent are used, bonding tack and open time of adhesives formulated from the polymers are reduced.

In the present invention, the polychloroprene gel content is based on the amount of tetrahydrofuran-insoluble polymer present as determined according to the following method:

Approximately 2 ml of latex (W), having solids content (L) is weighed and injected into a vessel containing 100 ml of tetrahydrofuran. The vessel is rolled for not less than 30 minutes and not more than 120 minutes to dissolve the soluble polymer. A 40 ml aliquot of the mixture is then centrifuged for 1 hour to separate the insoluble gel polymer from the tetrahydrofuran solution. A 20 ml portion of the supernatant liquid is removed and the solvent is evaporated. The weight of the soluble polymer (A) is then measured and the gel content is calculated according to the following equation:

$$\% \text{ gel} = 100 - 100[(F \times A)/(W \times L)]$$

where
F=normalization factor of 5.1
A=dried solids content of soluble portion
W=weight of latex sample
L=latex solids content The gel content of a polymer will vary depending on a number of factors related to polymerization and isolation conditions. For example, the amount of gel formed increases as temperature of polymerization and/or monomer conversion increases, whereas the amount of gel formed tends to decrease with increasing concentration of modifier, i.e. chain transfer agent, present in the polymerization mixture. Gel content of the chloroprene homopolymer component may thus be controlled during polymerization by adjusting the polymerization temperature, amount of chain transfer agent present, and percent monomer conversion.

Chain transfer agents are commonly used in many polymerization processes to control molecular weight without significantly altering polymerization kinetics. These agents react with growing polymer chain ends, resulting in termination and end-capping. Consequently, the greater the concentration of chain transfer agent, the lower will be the molecular weight of the polymer product. Polymerization in the presence of chain transfer agents results in conditions wherein growth of individual polymer molecules is controlled by end-capping without hampering kinetic chain propagation. For purposes of the present invention, the polymerization is carried out in the presence of a chain transfer agent selected from the group consisting of dialkyl xanthogen disulfide modifying agent, dialkoxy xanthogen disulfide modifying agents, or mercaptan modifying agents.

When xanthogen disulfide modifiers are used, they may be selected from the group consisting of dialkyl xanthogen disulfides or dialkoxy xanthogen disulfides. The dialkyl xanthogen disulfides which may be used can be represented by the structure:

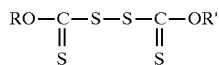

in which R and R' are alkyl groups containing from one to eight carbon atoms. Examples of suitable alkyl radicals are methyl, ethyl, propyl, isopropyl, and the various isomeric butyl, amyl, hexyl, heptyl, and octyl radicals. The preferred alkyl groups are those having one to four carbon atoms. Of these, diisopropyl xanthogen disulfide (PXD) is most preferred.

The dialkoxy xanthogen disulfide modifiers are compositions of the formula:

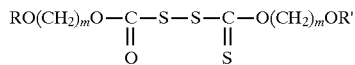

wherein R and R' are alkyl radicals having one to eight carbon atoms and m is two to six. Examples of suitable alkyl radicals are methyl, ethyl, butyl and hexyl.

Mercaptan-modified homopolymers may also be utilized to provide adhesives having characteristics equally attractive to those of the xanthogen disulfide-modified homopolymers. The long chain alkyl mercaptans used as modifiers (i.e. chain transfer agents) may contain from about four to about twenty carbon atoms and may be primary, secondary or tertiary, straight or branched, although the straight chain primary alkyl mercaptans are usually preferred. Representative mercaptans include butyl, hexyl, octyl, dodecyl and tridecyl mercaptans, as well as mixtures of mercaptans derived from coconut oil. Dodecylmercaptan (DDM) is the preferred chain transfer agent for a variety of reasons. In general, it is the least expensive chain transfer agent and the easiest to obtain. Moreover, the molecular weight of DDM is lower than that of other common chain transfer agents. Consequently, lower quantities can be used to achieve a desired gel content.

To obtain chloroprene homopolymers having gel contents within the range useful in the present invention, it is most effective to regulate the amount of chain transfer agent utilized during polymerization and also to control monomer conversion. At conversions of approximately 70 percent, chloroprene polymers begin to form relatively higher numbers of crosslinks due to interpolymer transfer reactions. When a chain transfer agent is present in the polymerization mixture, a balance is established between interpolymer crosslinks and end-capping. Adjustment of monomer conversion within the range of 70–100 percent serves to alter the molecular weight characteristics of the polymer, and consequently, the gel content. It has been found that use of between $2.5 \times 10^{-4}$–$5.5 \times 10^{-4}$ moles of chain transfer agent per mole of chloroprene monomer in a polymerization carried to 85 percent monomer conversion will provide gel contents of 10 to 50 percent. Slight adjustments in the amount of chain transfer agent or monomer conversion will provide higher or lower gel contents as required. Generally, the useful range of chain transfer agent for chloroprene polymerization is between $1 \times 10^{-5}$ to $1 \times 10^{-3}$ moles of chain transfer agent per mole of chloroprene monomer.

In preparing the chloroprene polymers useful in the present invention, polymerization of chloroprene monomer is preferably carried to a conversion of at most about 95 percent, at which point it is stopped by the addition of a polymerization inhibitor, e.g. phenothiazine. The polymerization emulsion is then stabilized by the addition of an agent such as, e.g. the sodium salt of disproportionated abietic acid. Conversions in the range of 70–95 percent are acceptable, with the preferred range being 80–85 percent. Conversions lower than 95 percent result in reduced chain grafting, thereby providing an optimum crystalline structure.

After polymerization is stopped, unpolymerized monomers are removed. The latex may optionally be creamed at this point to raise the solids content, e.g. to 55–60 percent. The creaming process causes limited particle agglomeration and a separation of concentrated latex from a serum phase which is very dilute in polymer.

The polymer compositions of the present invention are useful as components of aqueous latex adhesives. In particular, they are especially suited for use as polymeric components in adhesives employed for bonding foamed polymers to various substrates. Adhesives containing the polymers of the present invention are particularly useful in assembly of foamed cushions used in automobile interiors. Assembly of these parts requires adhesives having excellent performance at temperatures in excess of 120° C. because the bond must withstand ambient temperatures of 100° C.–120° C. which are generated inside automobiles parked in locations exposed to the summer sun.

Preferred latex adhesive formulations for foam bonding comprise the polychloroprenes of the present invention, 1 to 75 parts by weight of rosin per 100 parts by weight of polychloroprene, and a sufficient amount of water to provide a composition having a solids content of 25–65 weight percent based on the weight of the polychloroprene. The rosins suitable for use include for example, acids or terpenoid esters such as esters of abietic acid, hydrogenated abietic acid, disproportionated abietic acid, or polymerized abietic acid. Normally, the esters are lower alkyl esters of two to six carbon atoms, but this is not a critical limitation. Also, mixtures of rosins can be used. Rosins modify adhesive characteristics, e.g. tack, adhesion, cohesion, and hot bond strength. Adhesives of the present invention containing rosin concentrations of 1 to 75 parts per 100 parts chloroprene homopolymer exhibit rapid bond strength and high temperature resistance. Poor adhesion to some surfaces results if levels of less than 1 part rosin is used. In contrast, if greater than 75 parts are used, the heat resistance of the compositions is decreased. Preferably 10–60 parts rosin are used per 100 parts of chloroprene homopolymer. Most preferably 20–40 parts per 100 parts of chloroprene homopolymer are used because this provides the best balance of properties. The preferred aqueous latexes also contain sufficient water to provide a solids content of the homopolymer of between 25 and 65 weight percent, preferably between 30–50 weight percent. Latexes having solids contents of less than 25 weight percent are expensive to ship. If the solids content exceeds 65 weight percent the latex is generally unstable and difficult to pump, transport, or compound without coagulation.

In order to prevent corrosion or deterioration of certain substrates, for example, metal surfaces or fabric surfaces with which the adhesive comes in contact, it may be desirable to include an effective amount of antioxidant in the composition. Antioxidant is generally present in the composition in amounts up to 5 parts by weight per 100 parts by weight of the chloroprene polymer. For this purpose, many antioxidants well known in the art as being useful in polychloroprene formulations are acceptable. An example of such an antioxidant is 4,4'-thiobis(6-tertiary-butyl-3-methylphenol).

Various other conventional ingredients that may additionally be present in the latexes of the present invention include curatives such as epoxy compounds and metal oxides, stabilizers, surfactants, such as sodium lauryl sulfate, and fillers and pigments, such as carbon black, titanium dioxide, and clay. Various resins may also be added to further modify bonding characteristics. Such resins include alkyl phenolic resins, terpene phenolic resins, hydrogenated resin esters, coumarone indene resins, and hydrocarbon resins such as poly-alpha-methyl styrene.

Additionally, suitable acid acceptors are frequently added to the latex. Zinc oxide, which may be present as both acid acceptor and curative, may optionally be used in the compositions of the present invention. Acid acceptors should preferably have a surface area of at least 2 $m^2/g$ because such materials can be easily maintained in suspension. Zinc oxide is the preferred acid acceptor because of the superior long term cure properties of the resulting homopolymer.

The preferred aqueous latex adhesives may be prepared by mixing chloroprene homopolymer latex with emulsified rosin. The solids content of the aqueous latex adhesive may then be adjusted to between 25 and 65 weight percent if it is outside this range after addition of the rosin.

The aqueous latex adhesives are then applied to appropriate substrates in an convenient manner, for example, by painting or spraying on one side of the substrate or by roller coating. In practice, adhesives are applied to both surfaces to be bonded and the bonding operation is carried out within a temperature range of about 20° C. to 100° C. The adhesives exhibit outstanding heat resistance and green bond strength. For example, bonds which can maintain their integrity when used to bond foam in a strained curve configuration can be formed within seconds of application. These bonds do not fail when heated to 140° C. and exhibit bond strengths above the tear strength of the foam substrate itself. In addition, the adhesives resist hot soapy water soaks of 45 minutes with no loss of bond strength.

EXAMPLES

Test Methods

Physical properties of polymers prepared in the following examples were tested according to the following procedures.

Lap Shear

Samples of Wilsonart® brand decorative high pressure laminates (available from Ralph Wilson Plastics, Inc.) measuring 2.54 cm×10.16 cm×1.27 mm were bonded to samples of particle board measuring 2.54 cm×10.16 cm×1.27 cm and coated with 20–30g/$m^2$ dry weight of an adhesive in a manner such that there was a 5.08 cm overlap along the 10.16 cm surface. After 24 hours, bonded samples, measuring 2.54 cm×15.24 cm, were removed and tested as follows. Each sample was mounted vertically in a tensile test machine and pulled at a uniform rate of grip separation of 5.08 cm per minute at room temperature. The peak stress or the force required to separate the pieces completely was reported as failure force in units of kPa. The test was repeated at a temperature of 80° C.

Cleavage

Sample specimens were prepared as described in the lap shear test. Each specimen was mounted horizontally in a 73° C. oven by suspending the sample by the nonoverlapped end of the particle board, particle board side facing upward. A 500 g weight was attached to the non-overlapped end of the laminate and the time at which complete adhesive failure occurred, as indicated by complete separation of the adhesive bond, was reported as the average of three tests.

Creep

Canvas strips (0.05 g/$cm^2$ unbleached cotton duck) measuring 11.18 cm×2.54 cm were coated with a layer of adhesive sufficient to cover the fabric, leaving 2.54 cm at one end uncoated. A second coat of adhesive was applied and the fabric was dried. The strips were bonded together, adhesive faces together, congruent without overlap, and the uncoated ends in contact, by passing the strips through laminating rollers at a pressure of 137.9 kPa and a linear transport speed of 1 meter/minute. The sample was placed in an oven at 80° C. in a "T-peel" configuration. That is, the uncoated section of one layer of the laminate was clamped vertically to a rigid support mounted in a vertical position in the oven and the uncoated section of the facing layer of the sample was loaded with a 500 g weight. The length of opened bond was reported in centimeters at intervals of 15 minutes. Adhesive bonds which failed completely were designated with an "F".

Peel

Canvas to canvas test specimens were prepared and suspended in an oven as in the above-described creep test. Temperature was continuously increased at a rate of 2° C. every 5 minutes from an initial temperature of 40° C. to a final temperature of 180° C. The failure temperature was recorded as that temperature at which the adhesive bond completely separated. If the sample remained intact, 180° C. was shown as the temperature resistance.

Example 1

An aqueous emulsion was prepared by emulsifying 100 parts chloroprene, 0.07 parts of dodecylmercaptan (3.1×10$^{-4}$ moles per mole of chloroprene), 2.5 parts of disproportionated abietic acid, 0.9 parts of the potassium salt of a napthalenesulfonic acid formaldehyde condensate, 0.15 parts dimer acid, stabilized with 0.0001 part of p-tert-butylcatechol, and 80 parts water. Polymerization was carried out under nitrogen at 9° C. in the presence of a redox/free radical initiator system consisting of 0.1 part dextrose, 0.2 parts sodium formaldehyde sulfoxylate, 0.2 parts trisodium phosphate, 0.1 part potassium sulfite, and 0.001 parts sodium 2-anthraquinonesulfonate. A 5% solution of potassium persulfate was added dropwise until a conversion of 85% was attained. The polymerization was stopped by addition of 0.04 parts phenothiazine and the aqueous dispersion was stabilized with 0.44 parts of the sodium salt of disproportionated abietic acid. Unpolymerized monomer was removed by steam distillation at reduced pressure. The resultant chloroprene homopolymer latex contained 20% gel polymer insoluble in tetrahydrofuran. An adhesive latex was then prepared by mixing the components shown in Table I with the chloroprene homopolymer latex. The proportions in Table I are stated in amounts of additive per 100 parts of polychloroprene in the latex. Properties of adhesive bonds prepared using the adhesive latex are shown in Table I.

Example 2

A chloroprene homopolymer latex was prepared substantially as described in Example 1, using the same reaction conditions, reaction temperature, and amounts of reactants, catalysts and other ingredients except that 0.12 parts of diisopropylxanthogen disulfide per 100 parts of chloroprene ($3.9 \times 10^{-4}$ moles per mole of chloroprene) was added as a chain transfer agent in place of dodecylmercaptan. After removal of unreacted monomer, the resultant latex had a gel content of 12.2%. An adhesive latex was then prepared by mixing the components shown in Table I with the chloroprene homopolymer latex. The proportions in Table I are stated in amounts of additive per 100 parts of polychloroprene.

Control Example A

A chloroprene homopolymer latex was prepared substantially as described in Example 1 using the same conditions and amounts of reactants, catalysts, and other ingredients except that the polymerization took place at a temperature of 14° C. and the amount of dodecylmercaptan present was 0.09 parts per 100 parts chloroprene monomer ($3.9 \times 10^{-4}$ moles per mole of chloroprene). The gel content of the resultant latex after removal of unreacted monomer was 4.6%. An adhesive latex was then prepared by mixing the components shown in Table I with the chloroprene homopolymer latex. The proportions in Table I are stated in amounts of additive per 100 parts of polychloroprene. Properties of adhesive bonds prepared using the adhesive latex are shown in Table I.

Control Example B

A chloroprene homopolymer latex was prepared substantially as described in Example 1 using the same conditions and amounts of reactants, catalysts, and other ingredients except that the polymerization took place at a temperature of 9° C. and 0.11 parts of dodecylmercaptan per 100 parts chloroprene monomer ($4.8 \times 10^{-4}$ moles per mole of chloroprene) was used in place of 0.07 part dodecylmercaptan. The gel content of the resultant latex after removal of unreacted monomer was 1.1%. An adhesive latex was then prepared by mixing the components shown in Table I with the chloroprene homopolymer latex. The proportions in Table I are stated in amounts of additive per 100 parts of polychloroprene. Properties of adhesive bonds prepared using the adhesive latex are shown in Table I.

TABLE I

| Adhesive Formulation | Example 1 | Example 2 | Control Example A | Control Example B |
|---|---|---|---|---|
| Chloroprene | 100 | 100 | 100 | 100 |
| Rosin | 30 | 30 | 30 | 30 |
| Zinc Oxide | 4 | 4 | 4 | 4 |
| Antioxidant[1] | 2 | 2 | 2 | 2 |
| % Solids | 49 | 51 | 58 | 50 |
| Polymer Gel Content (%) | 20 | 12.2 | 4.6 | 1.1 |
| Conversion (%) | 85 | 92 | NA | 86 |
| Lap Shear @ 22° C. (kPa) | 1682 | 1372 | 1358 | 1455 |
| Lap Shear @ 80° C. (kPa) | 331 | 359 | 124 | 79 |
| Cleavage Test (minutes:seconds to failure; average of 3 tests) | 14:23 | 14:45 | 3:43 | 1:09 |
| Creep Test (cm) Bonds Aged 1 week | | | | |
| 15 minutes | 0.762 | 0.508 | 3.048 | 11.176 |
| 30 minutes | 1.016 | 0.762 | 6.858 | F[2] |
| 45 minutes | 1.016 | 0.762 | 11.176 | F |
| 60 minutes | 1.016 | 0.762 | F | F |
| 120 minutes | 1.270 | 0.762 | F | F |
| Peel Test (°C.)[3] | 175 | 180 | 89 | 73 |

[1]4,4'-thiobis(6-tertiary-butyl-3-methylphenol)
[2]Bond failure
[3]Temperature resistance test Example 3

Two chloroprene homopolymers, A and B, were prepared according to the method described in Example 1 using dodecylmercaptan as a chain transfer agent to adjust gel content. All conditions, amounts of catalyst, and other ingredients were the same as in Example 1, except as noted in Table II. Components listed in Table II are in parts per 100 parts monomer. Polymer samples A and B were used to prepare adhesive latexes falling within the scope of the present invention according to the method described in Example 1. Results of peel tests using the adhesive formulations are also shown in Table II.

TABLE II

| Example 3 | A | B |
|---|---|---|
| Polymerization Temperature (°C.) | 10 | 10 |
| Chloroprene Monomer | 100 | 100 |
| Dodecylmercaptan | 0.08[1] | 0.09[2] |
| Disproportionated abietic acid | 2.2 | 2.4 |
| Sodium alkylaryl sulfonate | 0 | 1 |
| Dextrose | 0.1 | 0.1 |
| p-tert-Butylcatechol | 0 | 0 |
| Sodium 2-anthraquinonesulfonate | 0 | 0 |
| Conversion (%) | 87.9 | 91 |
| Gel Content (%) | 5.6 | 11.2 |
| Peel Test (°C.) | 164 | 174 |
| Temperature Resistance | | |

[1]$3.5 \times 10^{-4}$ moles per mole of chloroprene
[2]$4.6 \times 10^{-4}$ moles per mole of chloroprene Example 4

Three chloroprene homopolymers were prepared according to the method described in Example 1 using diisopropylxanthogen disulfide as a chain transfer agent to adjust gel content. All conditions, amounts of catalyst and other ingredients were the same, except as noted in Table III. Components listed in Table III are in parts per 100 parts monomer. Polymer samples A–C were used to prepare adhesive latexes falling within the scope of the present invention according to the method described in Example 1. Results of peel tests using the adhesive formulations are also shown in Table III.

TABLE III

| Example 4 | A | B | C |
|---|---|---|---|
| Polymerization Temperature (°C.) | 11 | 11 | 10 |
| Chloroprene Monomer | 100 | 100 | 100 |
| Diisopropylxanthogen disulfide | 0.16[1] | 0.1[2] | 0.12[3] |
| Disproportionated abietic acid | 2.2 | 2.4 | 2.4 |
| Dextrose | 0.1 | 0.1 | 0.1 |
| p-tert-Butylcatechol | 0 | 0 | 0.001 |
| Sodium 2-anthraquinonesulfonate | 0 | 0 | 0 |
| Conversion (%) | 88.3 | 85.4 | 91.9 |
| Gel Content (%) | 78.7 | 45.1 | 12.2 |
| Peel Test (°C.) Temperature Resistance | 165 | 155 | 180 |

[1]$5.2 \times 10^{-4}$ moles per mole of chloroprene
[2]$3.3 \times 10^{-4}$ moles per mole of chloroprene
[3]$3.9 \times 10^{-4}$ moles per mole of chloroprene

We claim:

1. An elastomer composition which comprises a mercaptan-modified or xanthogen disulfide-modified crystalline 2-chloro-1,3-butadiene homopolymer having a gel content of 5–80 percent by weight which is prepared by free radical emulsion polymerization at a temperature of 5° C.–20° C., to a conversion of 70–95 percent, in the presence of $2.5 \times 10^{-4}$–$5.5 \times 10^{-4}$ moles of mercaptan or xanthogen disulfide modifier per mole of 2-chloro-1,3-butadiene.

2. The composition of claim 1 wherein the gel content of the 2-chloro-1,3-butadiene homopolymer is 15–35 percent by weight.

3. The composition of claim 1 wherein the temperature of the emulsion polymerization is 10°–15° C.

4. The composition of claim 1 wherein the 2-chloro-1,3-butadiene homopolymer is a dodecylmercaptan-modified 2-chloro-1,3-butadiene homopolymer.

5. The composition of claim 1 wherein the 2-chloro-1,3-butadiene homopolymer is a diisopropylxanthogen disulfide-modified 2-chloro-1,3-butadiene homopolymer.

6. The composition of claim 1 wherein the 2-chloro-1,3-butadiene homopolymer is prepared by emulsion polymerization to a monomer conversion of 80–85 percent.

* * * * *

UNITED STATES PATENT AND TRADEMARK OFFICE
CERTIFICATE OF CORRECTION

PATENT NO. : 5,773,544
DATED : June 30, 1998
INVENTOR(S) : Lance Alan Christell et al.

It is certified that error appears in the above-identified patent and that said Letters Patent is hereby corrected as shown below:

On the title page, item
    [73] Assignee line, change Dupont to DuPont
Column 10, line 2 of claim 3, change -15°C to -20°C.

Signed and Sealed this

Thirtieth Day of March, 1999

Attest:

Q. TODD DICKINSON

Attesting Officer     Acting Commissioner of Patents and Trademarks